(12) United States Patent
Tiberghien et al.

(10) Patent No.: US 10,876,665 B2
(45) Date of Patent: Dec. 29, 2020

(54) SOCKET ELEMENT FOR A QUICK CONNECTOR AND QUICK CONNECTOR COMPRISING SUCH A SOCKET ELEMENT

(71) Applicant: STAUBLI FAVERGES, Faverges (FR)

(72) Inventors: Alain-Christophe Tiberghien, Sevrier (FR); Christophe Durieux, Gilly sur Isere (FR)

(73) Assignee: STAUBLI FAVERGES, Faverges (FR)

( * ) Notice: Subject to any disclaimer, the term of this patent is extended or adjusted under 35 U.S.C. 154(b) by 407 days.

(21) Appl. No.: 15/382,973

(22) Filed: Dec. 19, 2016

(65) Prior Publication Data

US 2017/0184241 A1 Jun. 29, 2017

(30) Foreign Application Priority Data

Dec. 23, 2015 (FR) .................................... 15 63230

(51) Int. Cl.
*F16L 37/23* (2006.01)
*F16L 37/138* (2006.01)
*F16L 37/084* (2006.01)

(52) U.S. Cl.
CPC ........... *F16L 37/23* (2013.01); *F16L 37/0841* (2013.01); *F16L 37/138* (2013.01)

(58) Field of Classification Search
CPC ..... F16L 37/138; F16L 37/0841; F16L 37/23; F16L 37/113; F16L 37/252; F16L 37/00; F16L 37/08; F16L 37/084

(Continued)

(56) References Cited

U.S. PATENT DOCUMENTS 3,236,251 A * 2/1966 Hansen .................... F16L 37/23
137/614.05
4,114,853 A * 9/1978 Medvick ................. F16L 37/23
251/149.6

(Continued)

FOREIGN PATENT DOCUMENTS

CN 1256379 A 6/2000
CN 103851288 6/2014

(Continued)

OTHER PUBLICATIONS

Search Report in related French Application No. 1563230, dated Sep. 7, 2016.

(Continued)

*Primary Examiner* — Matthew Troutman
*Assistant Examiner* — William S. Choi

(57) ABSTRACT

This socket element (1) for a quick connector, for joining two fluid pipes (C1, C2), comprises a socket body (2) that is able to receive a plug element inserted along a rear direction (D2), a pushing ring (40), which is mounted translatably inside the socket body, an elastic return element (78) for the pushing ring, and a primary sealing gasket (64) housed in a housing (59) of the socket element and able to cooperate with the plug element inserted into the socket body. According to the invention, the socket element (1) further comprises a slide-ring (42) arranged around the pushing ring (40) and forming a bottom and a front wall (56) of the housing (59), the pushing ring forms a rear wall (57) of the housing (59), and the pushing ring (40) being translatable relative to the slide-ring (42).

15 Claims, 4 Drawing Sheets

(58) Field of Classification Search
USPC .... 285/374, 145.4, 305, 309, 316, 317, 335, 285/348, 349, 399, 148.14, 33, 148.21
See application file for complete search history.

(56) References Cited

U.S. PATENT DOCUMENTS

| | | | | |
|---|---|---|---|---|
| 4,388,947 | A * | 6/1983 | Steuerwald | F16L 37/23 137/557 |
| 4,664,148 | A * | 5/1987 | Magnuson | F16L 37/23 137/614.05 |
| 4,733,692 | A * | 3/1988 | Kotake | F16L 37/23 137/614.03 |
| 4,865,292 | A * | 9/1989 | Ekman | F16L 37/23 251/149.6 |
| 5,002,254 | A * | 3/1991 | Belisaire | F16L 37/0841 251/149.8 |
| 5,179,976 | A * | 1/1993 | Boland | F16L 37/23 137/614.04 |
| 5,209,528 | A * | 5/1993 | Weh | F16L 37/121 285/315 |
| 5,445,358 | A * | 8/1995 | Anderson | F16L 37/23 251/149.6 |
| 5,607,139 | A * | 3/1997 | Kjellberg | F16L 37/23 251/149.1 |
| 5,806,832 | A * | 9/1998 | Larbuisson | F16L 37/42 251/149.6 |
| 5,873,386 | A * | 2/1999 | Arosio | F16L 37/30 137/614.02 |
| 6,026,857 | A * | 2/2000 | Stucchi | F16L 37/23 137/614 |
| 6,029,701 | A * | 2/2000 | Chaffardon | F16L 37/28 137/614.06 |
| 6,283,443 | B1 * | 9/2001 | Taneya | F16L 37/133 251/149.6 |
| 6,379,072 | B1 * | 4/2002 | Brown | B29C 45/1775 403/31 |
| 6,412,828 | B1 * | 7/2002 | Lacroix | F16L 37/22 285/1 |
| 6,511,100 | B1 * | 1/2003 | Le Clinche | F16L 37/23 285/314 |
| 6,890,004 | B2 * | 5/2005 | Naito | F16L 37/22 285/314 |
| 6,904,932 | B1 * | 6/2005 | Haraughty | F16K 15/20 137/231 |
| 6,926,312 | B2 * | 8/2005 | Lacroix | F16L 37/0841 285/317 |
| 7,195,228 | B2 * | 3/2007 | Tiberghien | F16L 37/42 251/149.6 |
| 7,472,930 | B2 * | 1/2009 | Tiberghien | F16L 37/0841 285/316 |
| 7,673,911 | B2 * | 3/2010 | Liu | F16L 37/23 285/276 |
| 7,762,593 | B2 * | 7/2010 | Le Bars | F16L 37/23 285/277 |
| 7,926,783 | B1 * | 4/2011 | Liu | F16L 37/44 251/149.6 |
| 7,938,456 | B2 * | 5/2011 | Chambaud | F16L 37/23 285/1 |
| 8,033,524 | B2 * | 10/2011 | Tiberghien | F16L 37/0841 251/149.6 |
| 8,191,932 | B2 * | 6/2012 | Davis | F16L 37/23 137/614.05 |
| 8,256,743 | B2 * | 9/2012 | Tiberghien | F16L 37/0841 137/614.06 |
| 8,356,794 | B1 * | 1/2013 | Liu | F16L 37/42 251/149.6 |
| 8,469,406 | B2 * | 6/2013 | Takahashi | F16L 37/23 137/614.05 |
| 8,646,811 | B1 * | 2/2014 | Chang | F16L 37/23 251/149.1 |
| 9,464,742 | B2 * | 10/2016 | Taguchi | F16L 37/23 |
| 9,476,528 | B2 * | 10/2016 | Tiberghien | F16L 21/08 |
| 9,528,650 | B2 * | 12/2016 | Tiberghien | F16L 37/086 |
| 9,752,713 | B2 * | 9/2017 | Tiberghien | F16L 37/42 |
| 2002/0140227 | A1 * | 10/2002 | Kawakami | F16L 37/23 285/316 |
| 2002/0149200 | A1 * | 10/2002 | Fumioka | A61M 39/1011 285/81 |
| 2004/0084650 | A1 * | 5/2004 | Nicolino | F16L 37/084 251/149.6 |
| 2004/0094739 | A1 * | 5/2004 | Lacroix | F16L 37/0841 251/149.1 |
| 2005/0006896 | A1 * | 1/2005 | Naito | F16L 37/133 285/316 |
| 2005/0093297 | A1 * | 5/2005 | Gilpatrick | B08B 3/026 285/316 |
| 2007/0257485 | A1 * | 11/2007 | Arosio | F16L 19/005 285/316 |
| 2008/0088127 | A1 | 4/2008 | Tiberghien | |
| 2008/0185837 | A1 * | 8/2008 | Danielson | F16L 37/0848 285/86 |
| 2012/0061953 | A1 * | 3/2012 | Liu | F16L 37/23 285/305 |
| 2013/0320673 | A1 * | 12/2013 | Hopson | F16L 37/092 285/316 |
| 2013/0341914 | A1 * | 12/2013 | Lehmann | F16L 37/22 285/305 |
| 2014/0103637 | A1 * | 4/2014 | Lu | F16L 37/23 285/33 |
| 2014/0326346 | A1 * | 11/2014 | Marquis | F16L 37/23 137/798 |

FOREIGN PATENT DOCUMENTS

| | | |
|---|---|---|
| FR | 2516201 | 5/1983 |
| JP | 2009264479 A | 11/2009 |

OTHER PUBLICATIONS

European Search Report for Europe Application No. 16206071 dated May 2, 2017.

* cited by examiner

SOCKET ELEMENT FOR A QUICK CONNECTOR AND QUICK CONNECTOR COMPRISING SUCH A SOCKET ELEMENT

BACKGROUND OF THE INVENTION

The present invention relates to a socket element for a quick connector, this socket element being able to be coupled with a complementary plug element for a quick connector to form a quick connector for joining fluid pipes, as well as a quick connector comprising such a socket element and a complementary plug element for a quick connector.

Some known connectors are provided with an automatic locking system for the connection and are called "quick connector". This type of connector is commonly used to connect two ends of pipes to one another, to convey a gaseous or liquid fluid, in particular for quick connections on engine test bench cannulas, whether hot or cold. Generally, this type of connector includes a receiving body forming a socket end-piece of the connector, and intended to be fastened to one of the two pipe ends to be coupled. This connector also includes a plug end-piece mounted at the other of the two pipe ends to be coupled and designed to be coupled to the socket end-piece while being fitted in the receiving body and locked within the latter. The latter is provided with means for ensuring the sealing of the coupling, such that the two pipes are sealably connected.

FR-A-2,516,201 describes a quick connector in which the socket end-piece comprises an O-ring to ensure the sealing of the coupling. This O-ring is mounted bearing axially against an inner push-piece of the socket element, which in turn is pushed back by a spring toward the mouth of the socket end-piece, such that when the plug end-piece is coupled, the spring presses the O-ring against the plug end-piece via the push-piece. This system makes it possible to adjust the axial position of the sealing gasket to the actual length of the end part of the plug end-piece, which may vary from one plug end-piece to another. In this known connector, the seal is provided to bear against the axial end of the plug end-piece, which has a rounded shape, such that the seal provides frontal sealing of the connector.

Nevertheless, if the end part of the plug element coupled to the socket element has a particularly small outer diameter and a particularly large axial length, angular travel of the plug end-piece within the socket end-piece may occur. This travel may be a source of inappropriate positioning of the seal against the axial end of the plug end-piece, which causes a sealing flaw of the connector before and/or after pressurizing the pipe.

Furthermore, in this known connector, when no plug end-piece is coupled with the socket end-piece, the push-piece systematically compresses the seal against a stop of the receiving body under the action of the spring, such that the seal is needlessly biased in the uncoupled configuration. During coupling, the seal rubs against the inner surface of the receiving body under the action of the plug end-piece moving the push-piece, which limits the lifetime of this seal.

Consequently, the invention seeks to resolve the aforementioned drawbacks of the prior art, and proposes a new socket element able to provide optimal sealing despite any geometric dispersion of the plug elements with which the socket element may be coupled, with an extended lifetime of the seal.

BRIEF SUMMARY OF THE INVENTION

The invention relates to a socket element for a quick connector able to be coupled with a complementary plug element for a quick connector to join two fluid pipes, the socket element comprising:
  a socket body that defines a longitudinal coupling axis and that is able to receive the plug element inserted along a rear direction,
  a pushing ring, which is mounted translatably inside the socket body along the longitudinal coupling axis,
  an elastic return element for returning the pushing ring in a forward direction, opposite the rear direction, relative to the socket body, and
  a primary sealing gasket housed in a housing of the socket element and able to cooperate with the plug element inserted into the socket body.

According to the invention,
  the socket element further comprises a slide-ring, which is movable relative to the socket body along the longitudinal coupling axis and which is arranged around the pushing ring, the slide-ring forming a bottom and a front wall of the housing of the primary seal, the front wall being turned toward the rear direction,
  a forward end of the pushing ring forms a rear wall of the housing of the primary seal, an inner diameter of the forward end being smaller than an inner diameter of the primary seal, and
  the pushing ring is translatable relative to the slide-ring along the longitudinal coupling axis.

Owing to the invention, the primary seal is arranged in the slide-ring, and in particular in a housing that is axially defined by the pushing ring and the slide-ring, which form a movable assembly that follows the movement of the plug element relative to the socket body, along the longitudinal coupling axis, during coupling, such that the primary seal is not subjected to friction against the socket element and is thus preserved from wear. Furthermore, the housing has a variable length that adapts under the combined action of the elastic return element and the deformation of the primary seal. The deformation of the primary seal depending on the geometry, in particular the value of the outer diameter, of the plug element, the sealing of the quick connector is thus optimized, irrespective of the geometry of the plug element, by adapting the variable length of the housing. Furthermore, the value of the force necessary to couple or uncouple the plug element is reduced, inasmuch as the length of the housing may increase to allow a free deformation of the primary seal, if the plug element has a particularly large diameter.

According to other advantageous features of the invention, considered alone or in combination:
  the pushing ring is able to abut against the slide-ring along the rear direction;
  the socket element comprises elastic return means for returning the slide-ring to abut against the socket body in the forward direction in the uncoupled configuration;
  the pushing ring is able to abut against the slide-ring along the forward direction;
  in the uncoupled configuration, the elastic return element returns the pushing ring to abut in the forward direction against the slide-ring, an axial length of the housing, measured between the front wall and the rear wall parallel to the longitudinal coupling axis, then being greater than an axial thickness, measured parallel to the longitudinal coupling axis, of the primary seal in the free state;

along an inner radial direction relative to the longitudinal coupling axis, the rear wall extends beyond the front wall;

along an inner radial direction relative to the longitudinal coupling axis, the rear wall extends beyond the primary seal;

the slide-ring and the pushing ring form a movable assembly inside the socket body and the socket element further comprises an auxiliary seal that is arranged between the moving assembly and the socket body;

the pushing ring is able to abut against the socket body along the rear direction;

the slide-ring comprises a conical front surface that is coaxial with the longitudinal coupling axis and that converges along the rear direction, with a convergence angle comprised between 45 and 70°;

the socket element comprises a device for locking the plug element in the socket body in a coupled configuration of the quick connector, the locking device comprising movable locking elements in the socket body, between an inner radial locking position of the plug element and an outer radial unblocking position of the plug element, the locking device comprising a locking ring movable between a position blocking the locking elements in the inner radial position and an unblocking position allowing the radial movement of the locking elements; and the locking device comprises maintaining elements radially movable in the socket body between an inner radial position maintaining the plug element and an outer radial release position.

The invention also relates to a quick connector that comprises a socket element, according to the preceding, and a complementary plug element for a quick connector, comprising an outer radial surface. According to the invention, when the plug element is coupled with the socket element, the primary seal is inserted between the outer radial surface of the plug element and an inner radial surface of the slide-ring.

According to advantageous features of the invention, considered alone or in combination:

the plug element comprises a collar that protrudes from the outer radial surface and with which the locking device cooperates in the coupled configuration; and the plug element is able to abut against the pushing ring, during coupling of the plug element with the socket element.

BRIEF DESCRIPTION OF THE SEVERAL VIEWS OF THE DRAWING

The invention will be better understood upon reading the following description, provided solely as a non-limiting and non-exhaustive example and done in reference to the drawings, in which.

DETAILED DESCRIPTION OF THE INVENTION

Hereinafter, the term "axial" corresponds to a direction oriented parallel to the coupling axis X1 defined below and shown in FIGS. 1 to 3, the term "radial" corresponding to a direction oriented radially relative to this axis X1. Furthermore, "forward direction D1" refers to a direction parallel to the longitudinal coupling axis X1 and oriented toward the left in FIG. 1, and "rear direction D2" refers to a direction in the opposite sense.

Figure 1:
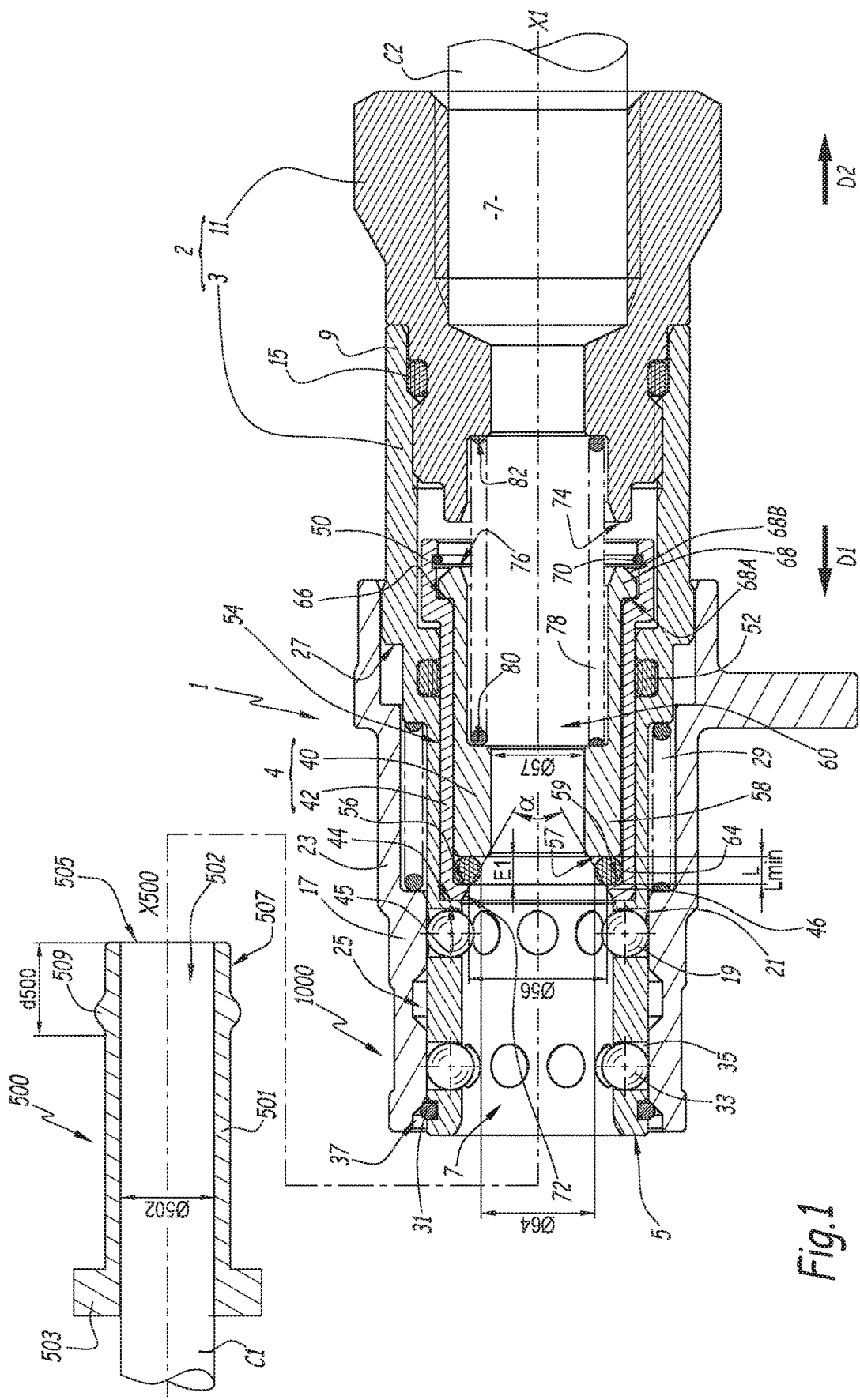
FIGS. 1 to 3 are longitudinal sectional views of a quick connector according to the invention, which comprises a socket element also according to the invention, this connector being shown in the uncoupled configuration in FIG. 1, during coupling in FIG. 2 and in the coupled configuration in FIG. 3.
Figure 2:
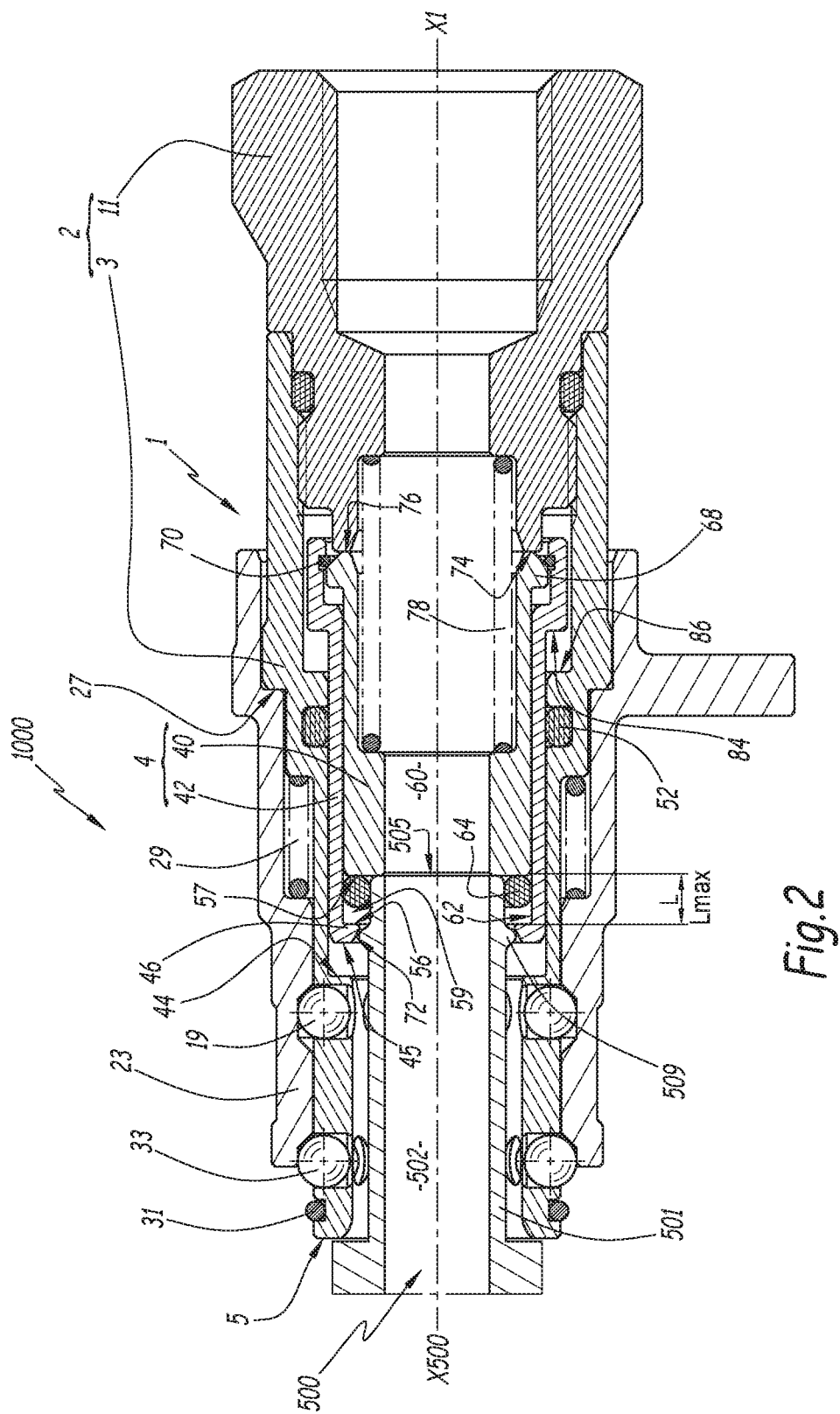
Figure 3:
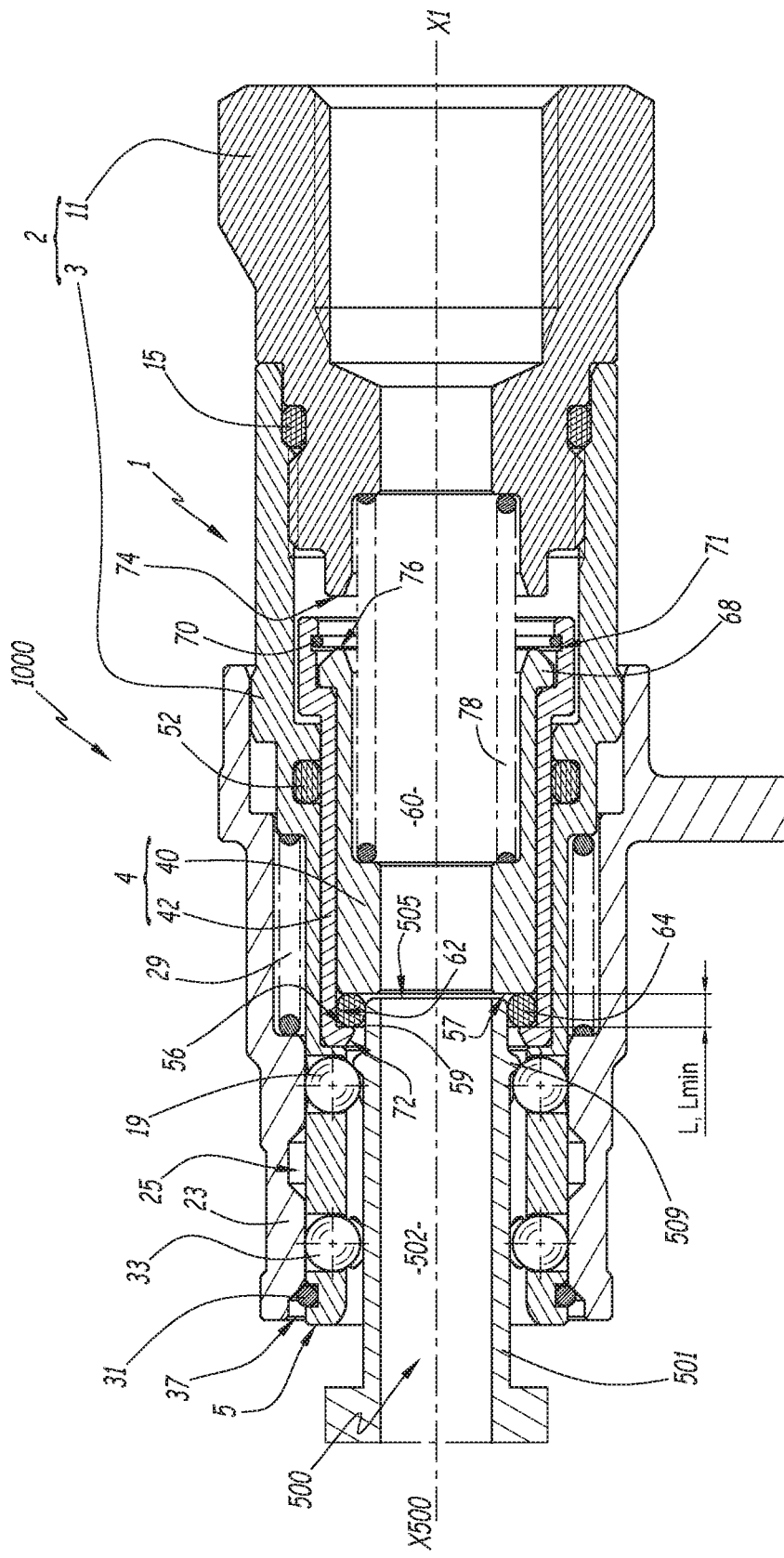

As shown in FIGS. 1 to 3, the socket element 1 and the plug element 500 make up parts of the fluid quick connector 1000, these parts being complementary and able to be coupled to one another to form the connector 1000.

The plug element 500 has a tubular general shape defining a primary axis X500 and in the case at hand comprises a substantially cylindrical body 501 coaxial to this axis X500. A passage channel 502 for the fluid is arranged through the primary body 501 along the axis X500. A first fluid pipe C1 is connected to a first end 503 of the primary body 501, a second end 505 of the primary body 501 being open, the fluid being intended to traverse the plug element 500 via the channel 502 in the direction D1. The fluid is transmitted to the plug element 500 by the socket element 1 via the end 505 in the coupled configuration. The primary body 501 defines an outer radial surface 507, with a substantially cylindrical shape with a circular base and coaxial to the axis X500. An annular collar 509 protrudes from the outer radial surface 507 between the ends 503 and 505. The collar 509 has a rounded profile with no sharp edges.

Figure 4:
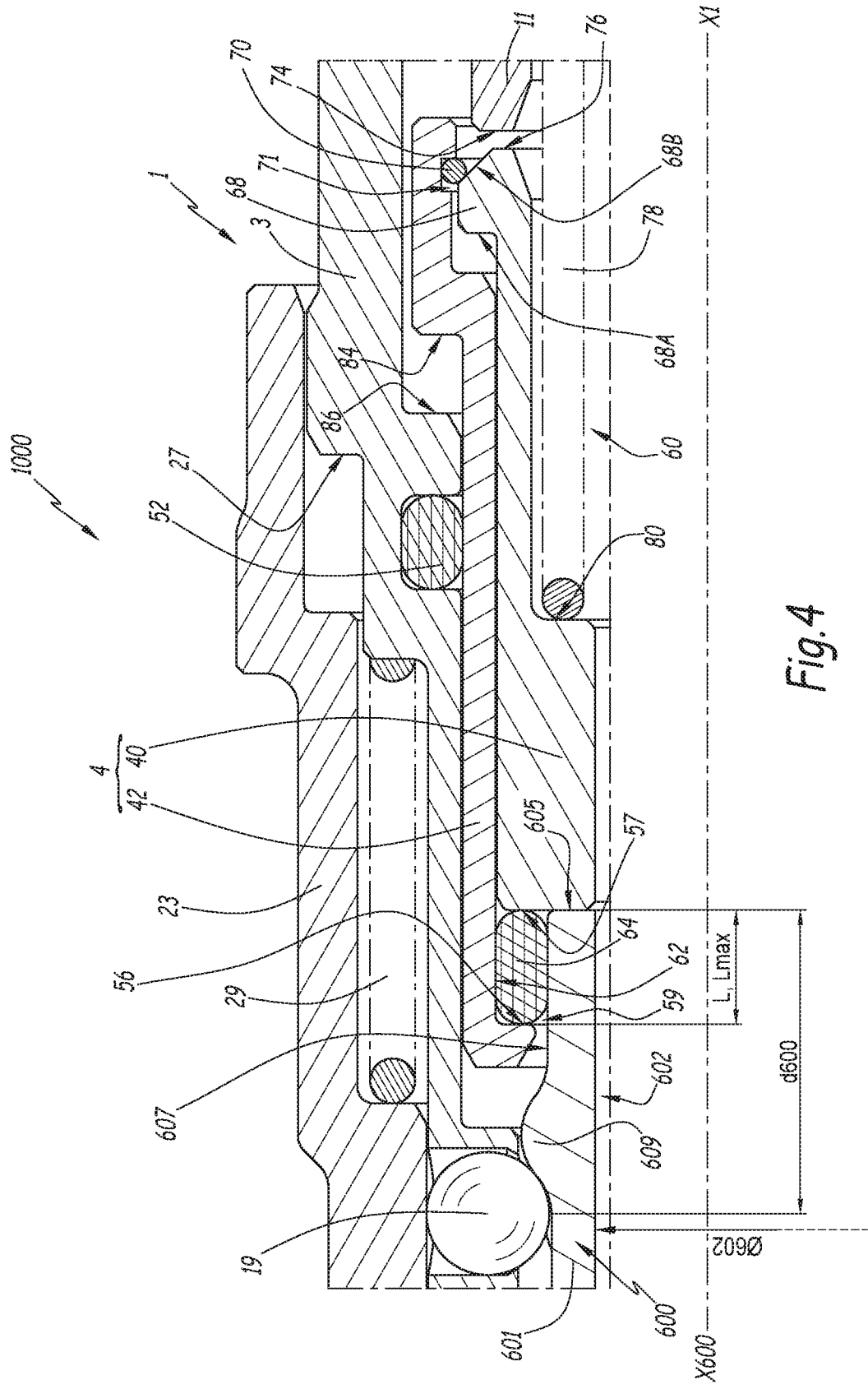
FIG. 4 is a partial longitudinal sectional view of the socket element of FIGS. 1 to 3, on a larger scale, shown coupled to a plug element different from that of FIGS. 1 and 3.

FIG. 4 shows the plug element 600, which may also make up part of the fluid quick connector 1000 by replacing the plug element 500 of FIGS. 1 to 3. The plug element 500 and 600 are similar, but have different dimensions. The shared features between the plug element 600 and the plug element 500 are identified in FIG. 4 with reference signs increased by 100. Thus, the plug element 600 defines a primary axis X600, and comprises a substantially cylindrical body 601 coaxial to this primary axis. The plug element also comprises a channel 602 arranged through the primary body 601, an open end 605, an outer radial surface 607 and a collar 609. The plug element 600 differs from the plug element 500 in that:

the outer radial surface 607 at the rear of the collar 609 has a diameter larger than that of the outer radial surface 507 at the rear of the collar 509, the collar 609 has an outer diameter larger than that of the collar 509, a distance d600, measured parallel to the primary axis X600, including the axial length of the collar 609 and the axial distance separating the collar 609 from the axial surface of the open end 605, is greater than the distance d500, measured parallel to the primary axis X500, including the axial length of the collar 509 and the axial distance separating the collar 509 from the axial surface of the open end 505, the axial length of the collar 609 is greater than that of the collar 509, the axial length being measured along the axis x500.

The plug element 600 shows the end geometries at the maximum acceptable allowances, while the plug element 500 shows the end geometries at the minimum acceptable allowances.

The socket element 1 comprises a socket body 2 comprising a receiving body 3 for receiving the plug element 500 or 600 and a rear ring 11. The receiving body 3 is generally tubular with a circular base, such that it defines a longitudinal coupling axis X1 with which this tubular shape is coaxial. The receiving body 3 ends at the front with an open front end 5, which is traversed by the coupling axis X1 and via which the plug element 500 or 600 can be inserted into an inner channel 7 of the receiving body 3, along the direction D2 oriented toward the rear, as sequentially shown in FIGS. 1, 2 and 3. The socket element 1 is designed so that the plug element 500 or 600 is coaxial, at least approximately, to the socket element 1, when these two elements are coupled. The receiving body 3 also comprises a rear end 9, the inner channel 7 extending from the front end 5 to the rear end 9. The rear ring 11, to which a second pipe C2 to be connected to the first pipe C1 is connected, is coaxially fastened to the receiving body 3 by its rear end 9, by screwing, this fastening being made sealed using a rear O-ring 15. The rear ring 11 extends the receiving body 3, and in particular the inner channel 7, along the rear direction D2, so as to place the latter in communication with the second pipe C2.

The socket element 1 is provided with a device 17 for locking the coupling of the plug element 500 or 600 with the socket element 1, this device 17 making it possible to selectively lock the plug element 500 or 600 in the receiving body 3 and to release this plug element 500 or 600 from the receiving body 3. The locking device 17 comprises locking beads 19 that are arranged within radial orifices 21 formed through the receiving body 3 at a first row placed in a front zone of the receiving body 3. The locking beads 19 make up locking elements that are movable relative to the receiving body 3, along radial trajectories relative to the coupling axis X1, from an inner radial locking position, limited by a conical neck of the orifices 21. In this inner radial position, the beads 19 protrude inside the inner channel 7. The beads 19 are movable to an outer radial unlocking position in which they are withdrawn from the inner channel 7 within radial orifices 21.

The locking device 17 also comprises maintaining beads 33 that are arranged within radial orifices 35 formed through the wall of the receiving body 3, with a shape similar to the radial orifices 21. The radial orifices 35 are arranged in a second row situated between the front end 5 and the first row of radial orifices 21. Like the locking beads 19, the maintaining beads 33 are movable relative to the receiving body 3, along radial trajectories relative to the coupling axis X1, between an inner radial position in which they protrude inside the inner channel 7 and an outer radial position in which the maintaining beads 33 are withdrawn from the inner channel 7 in the radial orifices 35.

Thus, two successive rows of moving beads 19 and 33 are provided at the front end 5 of the receiving body 3.

In the inner radial position, the beads 19 and 33 oppose the axial circulation of the plug element 500 or 600 by interaction with the collar 509 or 609, and the beads 19 lock the plug element 500 or 600, in particular if this collar 509 or 609 is situated behind the beads 19, as is the case when the plug element 500 or 600 is in a coupled position, as shown in FIG. 3. The plug element 500 or 600 is coupled with the socket element 1 while being locked by the beads 19. In the inner radial position, the beads 19 and 33 also oppose the insertion of the plug element 500 or 600 into the receiving body 3. When the beads 19 and 33 are in the outer radial position, as is the case in FIG. 2, the plug element 500 or 600 can translate along the axis X1 within the receiving body 3, and be coupled or uncoupled, the beads 19 and 33 no longer opposing the passage of the collar 509 or 609. While the first row of beads 19 is used to lock the plug element 500 or 600 in the coupled position, the second row of beads 33, in the inner radial position, positions the outer radial surface 507 or 607 of the plug element 500 or 600 in the receiving body 3, so as to align, at least approximately, the axis X1 with the axis X500 or X600, respectively. The maintaining beads 33 thus limit the travel of the plug element 500 or 600 in the receiving body 3 relative to the axis X1.

The locking device 17 further comprises a locking ring 23, which is arranged around the receiving body 3 and translatable parallel to the coupling axis X1 relative to the receiving body 3. The locking ring 23 is movable between a blocking position in which it blocks the beads 19 and 33 in the inner radial position, as is the case in FIGS. 1 and 3, and a unblocking position in which recesses 25 and 37 are radially aligned with the radial orifices 21 and 35, respectively, so as to allow a centrifugal radial movement of the beads 19 and 33 to the outer radial position. Thus, to couple the plug element 500 or 600 with the socket element 1, the locking ring 23 is pushed back in the rear direction D2 until it abuts against an outer shoulder 27 of the receiving body 3. A return spring 29 for returning the locking ring 23 to the blocking position, i.e., in the forward direction D1 and away from the shoulder 27, is provided, such that the locking ring 23 is in the blocking position in the uncoupled configuration. In practice, the spring 29 pushes the locking ring 23 back toward its blocking position in the forward direction D1 against an outer axial stop 31 of the receiving body 3, situated near the front end 5. In this blocking position, the locking ring 23 radially surrounds and covers the beads 19 and 33.

The socket element 1 also comprises a moving assembly 4, comprising a pushing ring 40 and a slide-ring 42, movable in the inner channel 7 of the socket body 2.

The slide-ring 42 has a generally tubular shape with a circular base. It is mounted translatably, within the inner channel 7, along the coupling axis X1. The translation of the slide-ring 42 is bounded, i.e., limited, in the forward direction D1 by an inner shoulder 44 of the receiving body 3, provided behind the row of radial orifices 21 within the inner channel 7. This inner shoulder 44 constitutes a stop against which an annular and axial surface 45 of the front end 46 of the slide-ring 42 turned in the direction D1 bears in the uncoupled configuration. The pushing ring 40 is mounted translatably inside the receiving body 3, and in particular within the slide-ring 42, such that the slide-ring 42 is arranged around the pushing ring 40. The pushing 40 and pull 42 rings are translatable relative to one another along the coupling axis X1, and slide in one another. The pushing ring 40 has a generally tubular shape with a circular base. It is coaxial with the slide-ring 42, an inner channel 60 of the pushing ring 40 being in communication with the inner channel 7 defined by the rear ring 11.

Near its front end 46, the slide-ring 42 comprises an inner shoulder 56. The inner shoulder 56 and an annular and axial surface 57 of a front end 58 of the pushing ring 40 form two axial walls of a housing 59, in the form of an inner groove of the moving assembly, which is open on the inner channel 7. In the case at hand, the inner shoulder 56 forms a front wall of the housing, while the surface 57 forms a rear wall of the housing 59. The front wall 56 faces the rear wall 57, the rear wall being turned toward the forward direction D1 and limiting the housing 59 in the rear direction D2 and the front wall 56 being turned toward the rear direction D2 and limiting the housing in the forward direction D1, the two walls 56 and 57 extending in planes perpendicular to the axis X1. The bottom of the housing 59 is formed by a generally cylindrical inner radial surface 62 of the slide-ring 42 that is arranged behind the inner shoulder 56 and that rejoins the inner shoulder 56. The housing 59 therefore forms a groove with a variable axial length L based on the relative position of the slide-ring 42 with respect to the pushing ring 40 along the coupling axis X1. This variable length L is measured between the rear wall 57 and the front wall 56 of the housing 59, parallel to the coupling axis X1.

The socket element 1 also comprises a primary sealing gasket 64 of the coupling between the plug element 500 or 600 and the socket element 1 that is arranged in the housing 59. The primary seal 64 is an elastically deformable O-ring, for example made from elastomer, and sized so as to be, in the coupled configuration, in tight contact, on its periphery, with the inner radial surface 62 of the slide-ring 42, such that the primary seal 64 is coaxial with the coupling axis X1. It is preferable for the seal 64 also to be in contact, on its periphery, with the inner radial surface 62 in the uncoupled configuration, as shown in FIG. 1. As illustrated in FIG. 3, the primary seal 64 is designed to be in tight contact, on its inner periphery, with the outer radial surface 507 or 607 of the plug element 500 or 600 when the connector 1000 is coupled. The primary seal 64 thus provides radial sealing of the coupling of the socket element 1 with the plug element 500 or 600. Only the seal 64 is axially inserted between the front 56 and rear 57 walls of the housing.

An auxiliary seal 52, with a toroid shape, is mounted within an inner annular groove of the receiving body 3, open on the inner channel 7, the auxiliary seal 52 being in sliding and sealed contact with a cylindrical outer radial surface 54 of the slide-ring 42, all around the latter. The auxiliary seal 52 is mounted slightly crushed between the surface 54 and the receiving body 3 such that the sealing is provided between the receiving body 3 and the slide-ring 42. During the translation of the slide-ring 42, the surface 54 rubs against the seal 52 parallel to the axis X1 and the seal 52 remains in tight contact with the receiving body and the moving assembly 4. This auxiliary seal 52 thus provides sealing of the coupling between the plug element 500 or 600 and the socket element 1, complementary to the radial sealing obtained using the primary seal 64. The complete sealing of the connector 1000 is thus obtained by the combined action of the seals 52 and 64. Advantageously, the auxiliary seal 52, which is subject to axial friction during the translation of the moving assembly 4 in the receiving body 3, can be optimized for these conditions, in particular inasmuch as the dimensions of the receiving body 3 and the slide-ring 42 are known. The primary seal 64 experiences a more limited quantity of friction compared to the auxiliary seal 52.

The translation of the push ring 40 relative to the slide-ring 42 is bounded in the forward D1 and rear D2 directions by the slide-ring 42, so as to limit the variations in the value of the length L of the housing 59. To that end, the slide-ring 42 comprises a rear inner shoulder 66 against which a front surface 68A of a rear outer protrusion 68 of the push ring 40 is intended to abut when the push ring 40 is translated in the forward direction D1 relative to the slide-ring 42, such that the shoulders 66 and protrusion 68 constitute a stop to bound the movement of the push ring 40 relative to the slide-ring 42 in the forward direction D1 and thus bound the variable length of the housing to a predetermined minimum value $L_{min}$, as illustrated in FIG. 1 and FIG. 3. The slide-ring 42 is also provided with an inner elastic annulus 70, preferably of the circlips type, which is attached in a groove 71 arranged on the inner radial surface 62 of the slide-ring 42, between the rear inner shoulder 66 and a rear end 50 of the slide-ring 42. A rear surface 68B of the rear outer protrusion 68 of the pushing ring 40 abuts against the inner annulus 70 when the pushing ring 40 is translated in the rear direction D2 relative to the slide-ring 42 during coupling, such that the rear surface 68B and the inner annulus 70 constitute a stop to limit the movement of the pushing ring 40 relative to the slide-ring 42 along the rear direction D2 and thus bound the variable length of the housing to a predetermined maximum value $L_{max}$ greater than the minimum value $L_{min}$, as shown in FIG. 4. In practice, the maximum value $L_{max}$ is about 40 to 60% higher than the minimum value $L_{min}$. The front surface 68A of the rear outer protrusion 68 extends in a radial plane relative to the axis X1, like the corresponding surface of the rear inner shoulder 66. The rear surface 68B, opposite the front surface 68A, of the rear outer protrusion 68 has a conical shape coaxial with the axis X1 and converging in the rear direction D2. Irrespective of the length L of the housing 59 comprised between $L_{min}$ and $L_{max}$, the inner radial surface 62 of the slide-ring 42 forms the bottom of the housing 59.

The primary seal 64 is in a so-called "free" state under the following conditions:
    when the plug element 500 or 600 is not present in the socket element 1,
    when the primary seal 64 is mounted in the slide-ring 42, but without contact with the front 56 and rear 57 walls.

When it is in the free state, the primary seal 64 has an axial thickness E1, measured parallel to the coupling axis X1 and visible in FIG. 1, that is preferably below the minimum value $L_{min}$ of the variable length L. In practice, the axial thickness E1 is 0.1 to 0.5 mm smaller than the minimum value $L_{min}$. Thus, when the primary seal 64 is not deformed by the plug element 500 or 600, the front 56 and rear 57 walls of the housing 59 do not compress the primary seal 64 axially, which makes it possible to improve the longevity of the primary seal 64. In particular, in the uncoupled configuration, when no plug element 500 or 600 is coupled with the socket element 1, the primary seal 64 is not axially stressed.

Irrespective of its state, the seal 64 is advantageously in contact with the bottom of the housing formed by the surface 62, as illustrated in the figures.

The translation of the pushing ring 40 is also bounded relative to the socket body 2 in the rear direction D2 by an annular and axial forward surface 74 of the rear ring 11, against which a corresponding rear surface 76, also annular and axial, of the pushing ring 40 is intended to bear when the pushing ring 40 is moved along the rear direction D2. Thus, the socket body 2 comprises a stop to bound the movement of the pushing ring 40 relative to the socket body along the rear direction D2.

Ultimately, the translation of the pushing ring 40 is done in the receiving body 3 between:
    a forward position, in which the forward surface 45 of the slide-ring 42 is abutting against an inner shoulder 44, and in which the forward surface 68A of the pushing ring 40 abuts against the rear inner shoulder 66 of the slide-ring 42, and
    a rear position, in which the rear surface 76 of the pushing ring 40 abuts against the forward surface 74 of the rear ring 11.

In practice, the rear end 50 of the slide-ring 42 does not abut against the rear ring 11, inasmuch as, during its movement in the rear direction D2, the movement of the slide-ring 42 is limited by its abutment against the forward surface 68A of the pushing ring 40, which in turn abuts against the rear ring 11.

The socket element 1 comprises a spring 78, which constitutes an elastic return element returning the pushing ring 40 toward its forward position. The spring 78 is mounted between an inner shoulder 80 of the pushing ring 40 and an inner shoulder 82 of the rear ring 11. In this configuration, the spring 78 pushes the pushing ring 40 back in the forward direction D1 relative to the receiving body 3. To that end, the spring 78 bears on the rear ring 11 of the socket body 2. If the pushing ring 40 abuts against the slide-ring 42 in the forward direction D1, the pushing ring 40 drives the slide-ring 42 in the forward direction D1 until the latter abuts against the receiving body 3. Thus, in the uncoupled configuration, the slide-ring 42 abuts against the receiving body 3 in the forward direction D1, under the action of the spring 78.

The surface 57 of the forward end 58, which forms the rear wall of the housing 59 of the primary seal 64, has a crown shape from which the inner channel 60 of the pushing ring 40 extends. The inner diameter Φ57 of this forward end 58 surface 57 is smaller than the inner diameter Φ56 of the inner shoulder 56, such that the rear wall 57 of the housing 59 extends beyond the forward wall 56 of the housing, along an inner radial direction, relative to the coupling axis X1. Furthermore, the inner diameter Φ57 is smaller than or equal to the inner diameter Φ64 of the seal 64, such that the rear wall of the housing 59 extends beyond the primary seal 64, along an inner radial direction, relative to the coupling axis X1. The forward end 58 therefore has a small enough inner diameter Φ57 to form a stop, against which the end 505, 605, respectively, of the plug element 500, 600, respectively, which comes into contact with the seal 64, bears, when the plug element 500, 600, respectively, it is undergoing coupling with the socket element 1, as shown in FIG. 2, FIG. 4 respectively. During coupling, the plug element 500, 600, respectively, is moved in the rear direction D2 and thus pushes the pushing ring 40 in this same direction against the spring 78.

The wall 57 and the pushing ring 40 therefore extend beyond the primary seal 64, in an inner radial direction, relative to the coupling access X1.

Preferably, the inner diameter Φ57 is considered to be smaller than or equal to the inner diameter Φ64 of the seal 64 in the uncoupled configuration with the seal 64 mounted in the housing 59. Preferably, in the uncoupled configuration with the seal 64 mounted in the housing 59, the inner diameter Φ57 is strictly smaller than the inner diameter Φ64 of the seal 64. Preferably, the diameter Φ57 is provided to be substantially equal to the diameter Φ502 of the channel 502, the diameter Φ602 of the channel 602, respectively.

In the present example, it will be noted that the inner diameter Φ57 of the forward end 58 is the same as that of the wall 57.

The radial dimension of the inner shoulder 56 is preferably larger than half the radial direction of the section of the primary seal 64 in the free state, to be compatible with the plug element collars of any geometry, while being able to keep the seal 64 within the housing 59.

The slide-ring 42 comprises a conical forward surface 72 that connects the inner shoulder 56 and the forward axial annular surface 45. This conical forward surface 72 is coaxial with the coupling axis X1 and forms an inner cone that converges along the rear direction D2. The opening angle α of the conical surface 72 is preferably equal to about 60°. Alternatively, the angle α is comprised between about 45 and 70°, preferably between 50° and 65°. The conical surface 72 allows the slide-ring 42 to be compatible both with the plug element 500 and the plug element 600, and more generally with the dimensions of these plug elements.

To couple the plug element 500 or 600 and the socket element 1, an operator pushes the locking ring 23 in the rear direction, until it abuts against the receiving body 3 to free the beads 19 and 33. The operator then grasps the plug element 500 or 600 and inserts it into the receiving body 3 in the socket element 1. The plug element 500 or 600 then passes through the row of beads 33 and 19 moving in the receiving body 3, then through the primary seal 64, compressing it radially against the bottom 62 of the housing 59, until it abuts against the pushing ring 40. The latter is then pushed by the plug element 500 or 600 in the rear direction D2 relative to the receiving body 3, until the pushing ring 40 abuts against the rear ring 11. During the movement of the pushing ring 40 in the receiving body 3, the slide-ring 42 is driven by the pushing ring 40 in rear abutment against the elastic annulus 70. The slide-ring 42, by translating in the rear direction D2 relative to the socket body 2, then rubs against the auxiliary seal 52. Ultimately, when the pushing ring 40 abuts against the rear ring 11, the end 505 or 605 of the plug element abuts against the pushing ring 40 and the primary seal 64 is radially compressed between the outer radial surface 507 or 607 and the inner radial surface 62, such that the sealing is engaged. At the beginning of coupling, the pushing ring 42 being pushed back in contact with the receiving body 3 in the forward direction D1 by the spring 78 and the pushing ring 40, the sealing engagement of the connector 1000 is done particularly early in the coupling process.

The operator, who has felt the plug element 500 or 600 abut in the rear direction D2 in the socket element 1, when the pushing ring 40 comes into contact with the socket body 2, releases the locking ring 23, which returns in the forward direction D1 under the action of the spring 29, until it abuts against the outer axial stop 31 of the receiving body 3. When the locking ring 23 returns, the latter drives the beads 19 and 33 toward their inner position by driving them from the recesses 25 and 37. In particular, the beads 19 are on the front side of the collar 509 or 609 of the plug element, as shown in FIGS. 3 and 4. The operator then releases the plug element 500 or 600. The spring 78, as well as the pressure from the fluid passing through the connector 1000, if fluid circulation has been established, push the assembly made up of the plug element 500 or 600, the primary seal 64, the pushing ring 40 and the slide-ring 42 in the forward direction D1, until the collar 509 or 609 is actively blocked in contact with the locking beads 19. The maintaining beads 33 ensure the coaxial nature of the coupling, during the movement of the plug element 500 or 600 in the forward direction D1 during coupling and in the coupled configuration, such that the outer radial surface 507 or 607 remains duly in sealed contact with the primary seal 64 over its entire inner circumference. The fluid circulates from the pipe C1 through the inner channel 60 and the inner channel 502 or 602 toward the pipe C2, or in the opposite direction, the sealing between the plug element 500 or 600 and the socket body 2 being provided optimally by the primary seal 64 and by the auxiliary seal 52.

Based on the actual dimensions of the plug element, and in particular the diameter of the outer radial surface 507 or 607, the geometry of the collar 509 or 609, and the distance d500 or d600, and based on the moment at which sealing is engaged by the primary seal 64 during coupling, the length L of the housing is optionally increased by relative movement of the pushing ring 40 with respect to the slide-ring 42.

As shown in FIG. 2, when the connector 1000 comprises the plug element 500, during coupling, when the pushing ring 40 abuts against the rear ring 11 and the end 505 of the plug element 500 abuts against the pushing ring, the length L reaches its maximum value, the pushing ring 40 being abutting against the slide-ring 42 in the rear direction D2, the collar 509 then being arranged in the volume defined by the conical forward surface 72 of the slide-ring 42. Under the effect of the spring 78 and any pressure from the fluid circulating in the connector 1000, the pushing ring 40 and the slide-ring 42 are pushed back in the forward direction D1 with the plug element 500. Once the pressurized fluid circulates in the connector 1000, the primary seal 64 is pushed back by the pressure in the forward direction D1, relative to the receiving body 3, against the slide-ring 42. The relative position of the slide-ring 42 with respect to the pushing ring 40 is then adjusted so that the length L is adapted to the dimensions of the compressed primary seal 64, which depend on the geometry of the plug element 500. Because the plug element 500 has a relatively small distance d500, the slide-ring 42, in the coupled configuration, is pushed back in the forward direction D1 until it abuts against the receiving body 3, the pushing ring 40 returning to abut on the front against the slide-ring 42 due to the small deformation of the seal 64 in contact with the outer radial surface 507 with a small diameter. In other words, the length L of the housing is its minimal value $L_{min}$ and the plug element 500 is no longer abutting against the pushing ring 40, as shown in FIG. 3.

If the connector 1000 comprises the plug element 600, when during coupling, this plug element 600 comes into contact with the primary seal 64, the primary seal 64 is then radially compressed by the outer radial surface 607, and, as an equivalent volume of primary seal 64, extends by deformation more greatly than in the case of the plug element 500. The forward wall of the housing, formed by the shoulder 56 of the slide-ring 42, therefore moves away from the annular and axial surface 57 of the pushing ring 40 that forms the rear wall of the housing 59 until the slide-ring 42 abuts against the inner annulus 70 of the pushing ring 40, and the length L reaches its maximum value $L_{max}$. The sealing is then engaged. The pushing ring 40 is pushed back in the rear direction D2 by the plug element 600, via the end 605 abutting against the pushing ring 40, until it abuts against the socket body. At the end of coupling, when the collar 609 is brought back by the spring 78, and optionally by the pressure of the fluid, against the locking beads 19 in the inner radial position, the pushing ring 40 remains in an offset position relative to the slide-ring and abutting against the slide-ring, i.e., the length L remains at its maximum value $L_{max}$. Due to the relatively large distance d600, the plug element 600 remains abutting against the pushing ring 40, and the slide-ring 42 remains separated from the inner shoulder 44 of the receiving body 3.

As shown in FIG. 3, the minimum value $L_{min}$ of the length L is adapted so that the primary seal 64, cooperating with the plug element 500, the diameter of the outer radial surface 507 of which is relatively small, fills the volume of the housing and has a sufficient deformation to ensure the sealing of the connector 1000. As shown in FIG. 4, the maximum value $L_{max}$ of the length L is adapted so that the primary seal 64, cooperating with the plug element 600, the diameter of the outer radial surface 607 of which is relatively large, fills the volume of the housing and has a sufficient deformation to ensure the sealing of the connector 1000. The sealing is thus provided for any plug element with an intermediate geometry between the minimum geometry of the plug element 500 and maximum geometry of the plug element 600.

After the pressurization, the contact zone between the primary seal 64 and the plug element 500 or 600 is localized axially, irrespective of the distance d500 or d600, as long as the housing is bounded at the maximum value $L_{max}$. The position of the zone of the potential contact between the seal 64 and the outer radial surface of any complementary plug element relative to the forward end of the plug element is thus precisely known, this position being identical irrespective of the geometry of said plug element, such that this outer radial surface can easily be adapted so as not to damage the seal 64 by friction.

The plug element 500 or 600 abutting against the pushing ring 40 that defines the rear wall of the housing 59 of the primary seal 64 during coupling, the primary seal 64 is precisely axially localized relative to the end 505 or 605.

The auxiliary seal 52 providing sealing between the moving assembly 4 and socket body 2 is advantageously arranged between the slide-ring 42 and the receiving body 3, which makes it possible to limit its friction. Nevertheless, alternatively, the seal 52 is arranged between the pushing ring 40 and the receiving body 3, which causes a greater quantity of friction, inasmuch as the translation of the pushing ring 40 is done over a distance greater than that of the slide-ring 42.

The plug element 500 or 600 abutting against the socket body, via the pushing ring 40, and in the rear direction D2 during coupling, the radial sealing engagement of the primary seal 64 with the plug element and the slide-ring 42 is ensured.

Alternatively, the primary seal 64 is an annular seal with a noncircular section.

Alternatively, any known locking device can be implemented in place of the locking device 17 described above. In particular, it is possible to provide a locking device able to lock the coupling of the plug element with no collar, for example using a system of beads maintained by jamming of the plug element via an inclined surface of a locking ring, or a system with claws or locking fingers cooperating with other collar geometries.

Alternatively, maintaining elements in a form other than beads can be used in the socket element according to the invention.

Alternatively, a valve is provided in the socket element and/or in the plug element. In particular, such a valve can be secured to the pushing ring, if the locking is done with the pushing ring 40 offset toward the rear relative to its position in the uncoupled configuration.

Alternatively, the abutment of the plug element against the pushing ring can be provided to be more behind the latter. In this case, it is provided that the rear wall of the housing does not extend past the seal 64 in an inner radial direction relative to the coupling axis. On the pushing ring 40, the stop surface for the plug element is then offset toward the rear relative to the rear wall 57 of the housing 59. For example, the stop surface is formed by a shoulder, i.e., a section with a reduced diameter relative to the wall 57 from which the inner channel 60 of the pushing ring 40 extends. Also in this alternative, the inner diameter of the forward end 58 is strictly smaller than the inner diameter Φ64 of the seal 64 in the uncoupled configuration. Thus, the plug element is able to bear against the stop surface of the pushing ring during coupling.

Alternatively, an additional spring is provided between the socket body 2 and the slide-ring 42, for example between an outer shoulder 84 of the slide-ring 42 and an inner shoulder 86 of the receiving body 3, to push the slide-ring 42 in the rear direction D2, which guarantees the engagement of sealing as early as possible in the coupling process. This particular spring then has a return force significantly lower than that of the primary spring 78. The slide-ring 42 is thus kept as close as possible to the primary seal 64 during coupling.

Alternatively, the forward and rear walls of the housing 59 are slightly inclined relative to the radial direction relative to the axis X1, the forward wall nevertheless remaining turned in the rear direction and the rear wall turned in the forward direction.

Alternatively, the abutment of the pushing ring on the slide-ring to bound the approach of the forward and rear walls of the housing 59 is omitted.

Alternatively, the device for locking the plug element in the socket body in the coupled configuration is implemented between a support of the socket body and a support of the plug body.

The embodiments and alternatives considered above may be combined to generate new embodiments of the invention.

The invention claimed is:

1. A socket element for a quick connector able to be coupled with a complementary plug element for the quick connector to join two fluid pipes, the socket element comprising:
 a socket body that defines a longitudinal coupling axis and that is able to receive the plug element inserted along a rear direction,
 a pushing ring, which is mounted translatably inside the socket body along the longitudinal coupling axis,
 an elastic return element for returning the pushing ring in a forward direction, opposite the rear direction, relative to the socket body,
 a slide-ring, which is movable relative to the socket body along the longitudinal coupling axis and which is arranged around the pushing ring, the pushing ring being mounted inside the slide-ring, and being translatable relative to the slide-ring along the longitudinal coupling axis during coupling of the plug element with the socket element,
 a housing, comprising:
  a bottom, formed by the slide-ring,
  a front wall, formed by the slide-ring, the front wall being turned toward the rear direction, and
  a rear wall, formed by a forward end of the pushing ring, the rear wall being turned toward the forward direction, and the front wall facing the rear wall with only a primary seal axially inserted therebetween,
 the primary seal housed in the housing and able to cooperate with the plug element inserted into the socket by radial sealing engagement of the primary seal with the plug element, wherein the primary seal is in tight contact, on its inner periphery, with an outer radial surface of the plug element when the quick connector is coupled,
 wherein:
  an inner diameter of the forward end is smaller than an inner diameter of the inner periphery of the primary seal.

2. The socket element according to claim 1, wherein the pushing ring is able to abut against the slide-ring along the rear direction.

3. The socket element according to claim 1, wherein the socket element comprises elastic return means for returning the slide-ring to abut against the socket body in the forward direction in the uncoupled configuration.

4. The socket element according to claim 1, wherein the pushing ring is able to abut against the slide-ring along the forward direction.

5. The socket element according to claim 4, wherein in the uncoupled configuration, the elastic return element returns the pushing ring to abut in the forward direction against the slide-ring, an axial length of the housing, measured between the front wall and the rear wall parallel to the longitudinal coupling axis, then being greater than an axial thickness, measured parallel to the longitudinal coupling axis, of the primary seal in a free state, in which the primary seal has no contact with the front wall and with the rear wall.

6. The socket element according to claim 1, wherein along an inner radial direction relative to the longitudinal coupling axis, the rear wall extends beyond the front wall.

7. The socket element according to claim 1, wherein along an inner radial direction relative to the longitudinal coupling axis, the rear wall extends beyond the primary seal.

8. The socket element according to claim 1, wherein the slide-ring and the pushing ring form a movable assembly inside the socket body and in that the socket element further comprises an auxiliary seal that is arranged between the moving movable assembly and the socket body.

9. The socket element according to claim 1, wherein the pushing ring is able to abut against the socket body along the rear direction.

10. The socket element according to claim 1, wherein the slide-ring comprises a conical front surface that is coaxial with the longitudinal coupling axis and that converges along the rear direction, with a convergence angle comprised between 45° and 70°.

11. The socket element according to claim 1, wherein it comprises a locking device for locking the plug element in the socket body in a coupled configuration of the quick connector, the locking device comprising movable locking elements in the socket body, between an inner radial locking position of the plug element and an outer radial unblocking position of the plug element, and a locking ring movable between a position blocking the locking elements in the inner radial position and an unblocking position allowing the radial movement of the locking elements.

12. The socket element according to claim 11, wherein the locking device further comprises maintaining elements radially movable in the socket body between an inner radial position maintaining the plug element and an outer radial release position.

13. A quick connector, wherein it comprises:
 a socket element kit according to claim 1, and
 the complementary plug element for the quick connector,
 and wherein, when the plug element is coupled with the socket element, the primary seal is inserted between the outer radial surface of the plug element and an inner radial surface of the slide-ring.

14. The quick connector according to claim 13, wherein the plug element comprises a collar that protrudes from the outer radial surface and with which a locking device cooperates in the coupled configuration.

15. The quick connector according to claim 13, wherein the plug element is able to abut against the pushing ring, during coupling of the plug element with the socket element.

* * * * *